Jan. 1, 1963 P. C. HOSKING 3,071,221
WHEEL SPINNER
Filed May 5, 1958 3 Sheets-Sheet 1

INVENTOR
PAUL C. HOSKING
BY John C. Black
ATTORNEY

Jan. 1, 1963 P. C. HOSKING 3,071,221
WHEEL SPINNER

Filed May 5, 1958 3 Sheets-Sheet 2

INVENTOR
PAUL C. HOSKING

BY John C Black
ATTORNEY

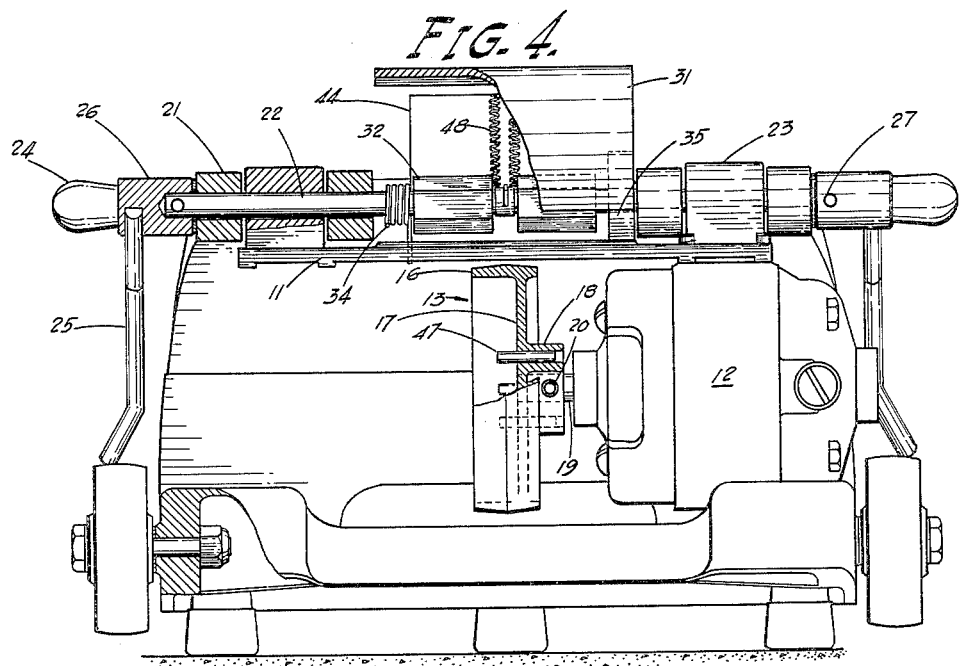
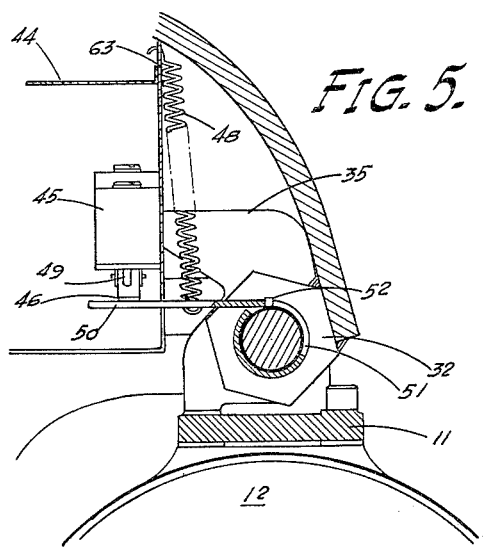

3,071,221
WHEEL SPINNER

Paul C. Hosking, Wilmette, Ill., assignor to Stewart-Warner Corporation, Chicago, Ill., a corporation of Virginia
Filed May 5, 1958, Ser. No. 732,897
5 Claims. (Cl. 192—4)

This invention relates to improvements in wheel spinning and braking apparatus for vehicle wheel balancers.

In the past, a considerable amount of difficulty has been experienced in spinning vehicle wheels for balancing purposes. As a result of the characteristics of the prior art spinners, a considerable amount of force was required to maintain the spinner in operating engagement with the vehicle wheel being spun. The tendency of the reacting forces of the wheel and the spinner were such that the spinner was forced away from the wheel. In many instances, serious accidents have occurred when the operator, in attempting to maintain the spinner in engagement with the wheel, applied too much force causing tipping and twisting of the spinner.

In the prior art spinners of this type, the same problem was experienced with regard to braking, the reacting forces of the brake and the wheel being such as to force the brake away from the wheel.

It is an object of the present invention to provide a spinner in which the reacting forces of the wheel and spinner are such as to draw the spinner into proper operative engagement with the wheel incident to initial engagement of the wheel by the spinner with a minimum of operator force.

It is another object of the present invention to provide a braking arrangement wherein the reacting forces of the wheel and the braking element cause proper braking engagement of the wheel and element incident to the initial engagement of the braking element with the wheel with a minimum application of force by the operator.

The feature whereby the objects of the present invention are accomplished in the pivotal mounting of a spinner motor and its associated spinner disc from an overhead pivot shaft and the mounting of a brake element on the pivot shaft immediately above the spinner motor and disc with the direction of rotation of the motor being such that the vehicle wheel will be rotated in a direction extending from the top of the brake element toward the spinner.

Another feature is the improved spinner motor switch actuating linkage.

Another feature is the improved stop elements for limiting the movement of the motor and the brake during operation.

Another feature is the use of a cam for moving the spinner and the brake to their respective operating positions.

Another feature is the use of a spring for urging the cam into engagement with the brake and the brake into engagement with the spinner mounting plate.

Other objects and features will be evident upon a perusal of the following description in which:

FIGS. 3, 4, and 5 are sectional elevational views of certain of the mounting and actuating elements of the improved spinner.

Figure 1:
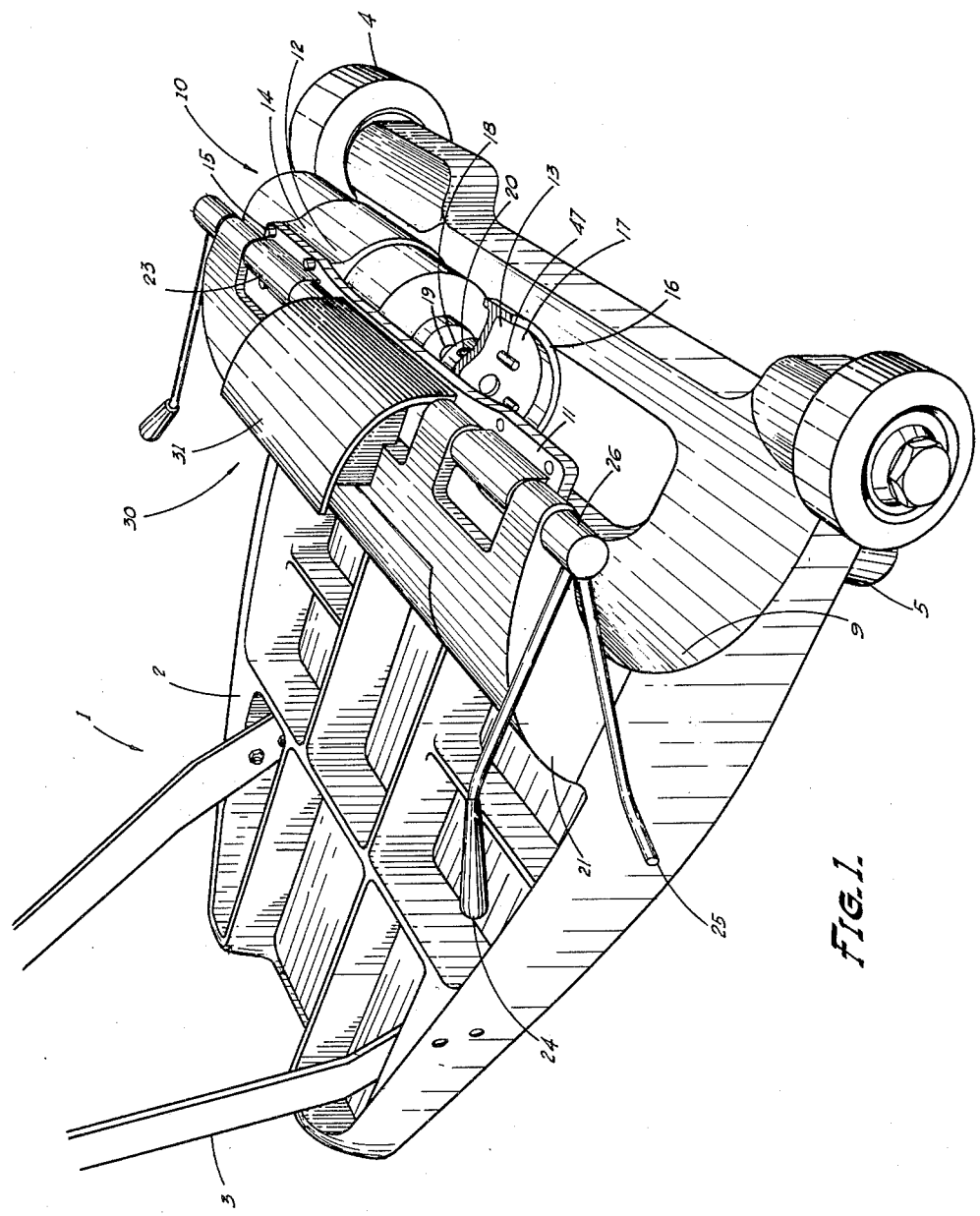
FIG. 1 is a perspective view of the improved spinner.
Figure 2:
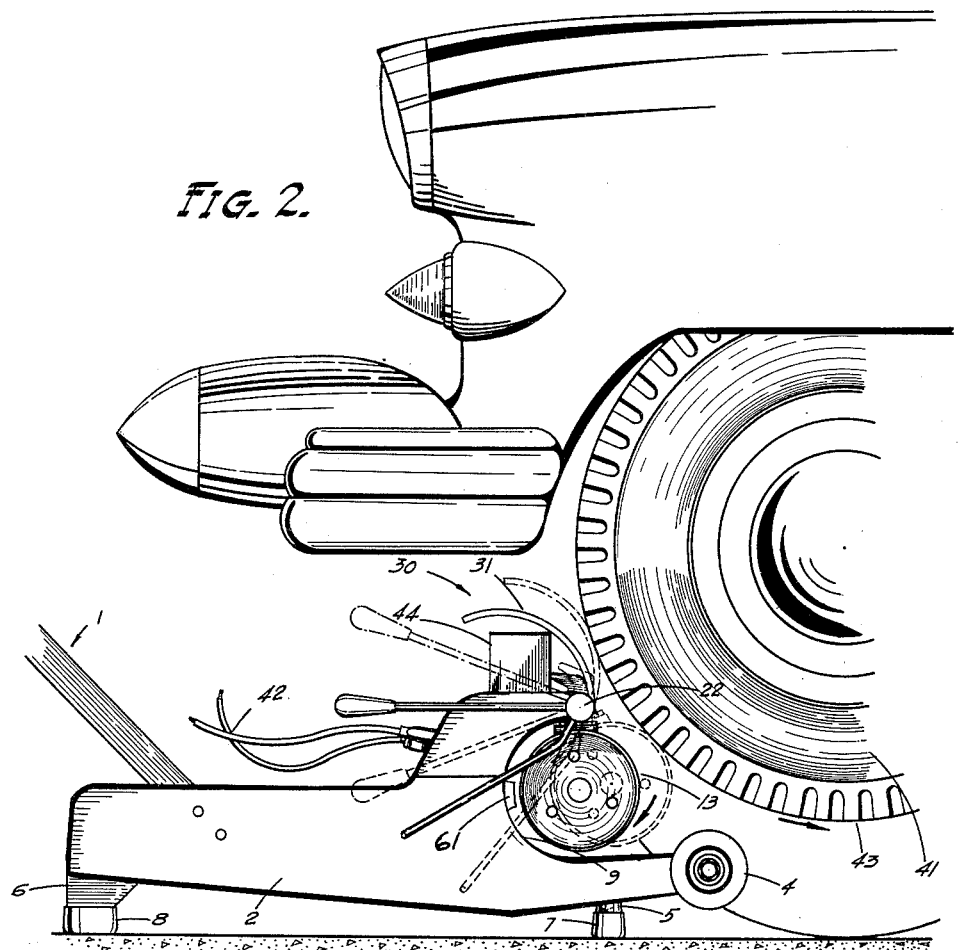
FIG. 2 is a side elevation view of the improved spinner in operating relationship with an automobile wheel.

In FIG. 1 it can be seen that the improved spinner 1 includes a frame 2 having an upright handle 3 secured to the rearward portion thereof and a pair of wheels 4 secured to the forward portion thereof for easy movement of the spinner. A pair of legs 5 are secured to the lower surface of the forward end of the spinner. A second pair of legs 6 are rigidly secured to the lower surface at the rear of frame 2. During operation, the spinner 1 and its associated operating elements rest upon the legs 5 and 6 as best shown in FIG. 2. The lower ends of the legs 5 and 6 may be provided with rubber cup elements 7 and 8 to prevent slipping of the spinner 1 during operation.

The forward end of the spinner frame 2 includes a generally concave recess 9 for receiving a spinner assembly 10. The assembly 10 includes a mounting plate 11, a spinner motor 12 and a pulley 13. The spinner motor 12 may be a conventional high torque AC motor of the type commonly used in vehicle wheel spinning apparatus. The frame 14 of the motor 12 is suitably secured to the bottom of the mounting plate 11 by bolts 15.

The pulley 13 (FIG. 4) is a conventional wheel spinner pulley having an annular spinning portion 16, an integral web 17, and a hub 18. The hub 18 is rigidly secured to the shaft 19 of the spinner motor 12 by means of a set screw 20.

An upwardly and forwardly projecting section 21 of the frame 2 carries a rotatable pivot shaft 22 at its forward end. The spinner mounting plate 11 is rotatably carried by the shaft 22 by means of a pair of U-shaped upwardly extending projections 23 which are rigidly secured to the plate 11. A pair of handles 24 (FIG. 1) and a pair of foot-actuated levers 25 are secured to hubs 26 which are in turn carried by and rigidly secured to opposite ends of the pivot shaft 22. The hubs 26 and the shaft 22 are held in place by pins 27 (FIG. 4).

It will be noted that the assembly 10 is disposed on one side of the spinner frame 2 with the pulley 13 approximately at the center of the frame 2. Thus, in applications where much more power is required for example, heavy duty trucks, a second spinner motor (not shown) may be secured to the mounting plate 11 at the other side of the frame. Pins 47 secured to the pulley 13 engage an apertured plate (not shown) secured to the shaft of the second motor for heavy duty operation.

Figure 3:
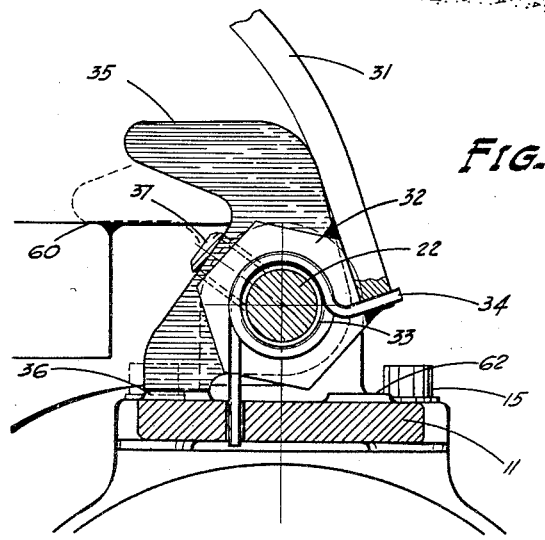

The spinner assembly 10 (FIG. 2) normally rests in a position immediately below the shaft 22 due to gravity. A brake assembly 30 is rotatably carried by the pivot shaft 22 immediately above the pulley 13. The brake assembly 30 includes an arcuate braking elements 31 rigidly secured to a hexagonal element 32 (FIG. 3) for example, by welding. The hexagonal element 32 includes an axial aperture 33 for rotatably receiving the pivot shaft 22.

An actuator cam 35 (FIG. 3) is carried by the pivot shaft 22. The actuator cam 35 engages the braking element 31 at its upper right hand portion with respect to FIG. 3. The lower left hand portion of the actuator cam 35 engages a stop 36 on the mounting plate 11. A spring 34 secured to the braking element 31 and to the mounting plate 11 normally urges the braking element 31 and the plate 11 into engagement with the cam 35. Thus, the spring 34 urges the braking element 31 counterclockwise with respect to FIG. 3 and the braking element 31 engages the actuator cam 35 to urge it into engagement with the stop 36. The actuator cam 35 is held in rigid engagement with the pivot shaft 22 by a set screw 37, whereby the actuator cam 35 is rotated with the pivot shaft 22 whenever an operator rotates the shaft 22 by means of either of the handles 24 or levers 25.

When the pivot shaft 22 is rotated counterclockwise, the actuator cam 35 engages the stop 36 to rotate the stop, and therefore the mounting plate 11 and the spinner assembly 10, counterclockwise. Alternatively, when the pivot shaft 22 is rotated in a clockwise direction with respect to FIG. 3, the actuator cam 35 is rotated to move the braking element 31 in a clockwise direction. Thus, it can be seen that either one of the assemblies, the spinner assembly 10 or the brake assembly 30, may be rotated to their respective operating positions each independently of the other. The operating positions of the spinner assembly 10 and the brake assembly 30 are shown in broken lines in FIG. 2.

Counterclockwise movement of the spinner assembly 10 to its operating position is preferably limited to approximately 21° by the engagement of the cam 35 with the stop surface 60 (FIG. 3) on the frame 2. Clockwise rotation of the assembly 10 beyond its normal position is limited by engagement of the motor 12 with the projection 61 (FIG. 2) on the frame section 21.

Clockwise rotation of the brake assembly 30 to its operating position is preferably limited by the engagement of the lower surface of the brake 31 with the upwardly extending boss 62 (FIG. 3) on the mounting plate 11. Counterclockwise rotation of the assembly 30 beyond its normal at rest position shown in solid lines in FIG. 2 is preferably limited by engagement of the brake 31 with a projection 63 (FIG. 5) on a starter switch box 44. The box 44 is rigidly secured to the upper central portion of the frame section 21.

The motor 12 is started by a microswitch 45 (FIG. 5) mounted within the box 44 incident to initial counterclockwise movement of the spinner assembly 10 toward its operating position. An arm 46 pivotally secured to bottom of the switch 45 engages a pin 49 to operate the switch 45. When the pin 49 is in its uppermost position as shown in FIG. 5, electric contacts (not shown) maintain the motor circuit (not shown) open. An actuator arm 50, rotatably mounted on the pivot shaft 22, is normally urged upwardly against the arm 46 by a pair of springs 48 to maintain the motor circuit open. The arm 50 has an arcuate slot 51 for receiving a pin 52 secured to the shaft 22.

When the shaft 22 is rotated counterclockwise, the pin 52 engages the arm 50 at the upper end of the slot 51 to rotate the arm 50. When the arm 50 rotates, the arm 46 and the pin 49 move downwardly to close the motor circuit, thereby to energize the motor 12.

When the shaft 22 is rotated clockwise from its normal position shown in FIG. 5, the pin 52 rides in the slot 51; and the arm 50 does not move.

The operation of the spinner is as follows: the vehicle wheel 41 to be spun is raised in a proper distance above the floor for example two inches, by a conventional jack applied to the axle of the vehicle wheel. The spinner 1 is tilted forwardly by an operator for free movement on its wheels 4 with the legs 5 and 6 out of engagement with the ground 40 (FIG. 2). The spinner 1 is rolled to a position immediately adjacent the vehicle wheel 41 with the pulley 13 and the brake element 31 very close to but not engaging the vehicle wheel 41. The spinner 1 is then permitted to tilt rearwardly to rest on its legs 5 and 6 as shown in FIG. 2. The electric wires 42 are connected to a suitable power source (not shown) and to the motor 12 by way of the microswitch 45. The switch 45 is actuated to start the motor 12 incident to rotation of the handle 24 by the operator in a counterclockwise direction.

The spinner assembly 10 is rotated into the dotted line position (FIG. 2), in which the pulley 13 physically engages the outer periphery 43 of the tire 41.

The pulley 13 rotates clockwise to spin the wheel counterclockwise. The interaction of the pulley 13 and the wheel 41 has a tendency to urge the pulley into closer engagement with the wheel thereby to minimize the energy expended by the operator to hold the pulley against the wheel and also to provide a constant smooth engagement of the pulley and wheel. The force resulting from the interaction of the pulley and wheel may be increased or decreased by initially locating the axis of the shaft 22 in a position further from or closer to the point of engagement the wheel toward an imaginary line connecting the axis of the pivot shaft 22 with the axis of the wheel 41 as best shown in FIG. 2.

After the wheel is spinning at a desired speed, the operator releases the handle 24 and gravity returns the assembly 10 to its normal position.

When it is desired to stop the wheel, the operator rotates the handle 24 clockwise to bring the brake 31 into engagement with the wheel 41. The interaction of the brake and wheel urges the brake into tighter, wedging engagement with the wheel to stop the wheel. The amount of force resulting from the interaction of the brake and wheel is determined by the distance between the pivot shaft 22 and the wheel 41 as in the case of the pulley and wheel interaction.

While there has been described what is at present believed to be the preferred embodiment of the invention, it will be understood that various changes and modifications may be made therein; and it is contemplated to cover in the appended claims all such changes and modifications as fall within the true spirit and scope of the invention.

What is claimed is:

1. Apparatus for spinning a vehicle wheel comprising a frame, a shaft horizontally disposed on the frame for pivotal movement adjacent the wheel periphery, a spinner disposed below the shaft and pivotally carried thereby, a brake element disposed above the shaft and pivotally carried thereon, structure for moving the spinner and brake about the axis of the shaft into engagement with the vehicle wheel periphery in positions respectively below and above a plane extending radially from the axis of the shaft to the axis of the wheel, and means rotating the spinner in a direction providing movement of the spinner periphery along a path extending generally from a position adjacent the shaft toward the position in which the periphery engages the wheel, whereby the initial respective engagements of the spinner and the brake with the wheel urge the spinner and brake respectively into operating engagement with the wheel.

2. Apparatus for spinning a vehicle wheel comprising a frame, a pivot shaft rotatably mounted in an elevated horizontal position on the frame, a spinner disposed below the shaft, a mounting plate secured to the spinner and rotatably carried by the shaft, a generally arcuate brake disposed above the shaft and rotatably carried thereon, an actuating element secured to the shaft for rotation therewith and disposed for engagement with the brake and with the mounting plate, a resilient biasing element urging the brake and the mounting plate into engagement with the actuating element whereby rotation of the pivot shaft in one direction causes the actuating element to engage the mounting plate to rotate the spinner into engagement with a vehicle wheel which is to be rotated and whereby rotation of the pivot shaft in the opposite direction causes the actuating element to engage and rotate the brake into engagement with the wheel, the pivot shaft adapted for positioning adjacent the wheel periphery for engagement of the spinner and brake with the wheel in positions respectively below and above a plane extending radially from the axis of the pivot shaft toward the axis of the wheel, and means rotating the spinner in a direction extending from a position adjacent the pivot shaft toward the position in which it engages the wheel, whereby initial respective engagements of the wheel with the spinner and brake cause the spinner and brake respectively to be urged toward operating engagement with the wheel.

3. The combination claimed in claim 2 together with stop means permitting only limited pivotal movement of the spinner and brake to their respective operating positions.

in the groove for actuating the arm incident to movement of the spinner toward its operating position to start the spinner motor.

5. In a spinner unit of the type in which a driving surface rotatable on its axis is brought into engagement with a vehicle wheel to rapidly rotate the wheel on its axis, the combination with the surface of a mounting means supporting the surface for pivotal movement about a second axis, the mounting means adapted for positioning adjacent the wheel periphery for movement of the surface into engagement with the wheel periphery in a position on one side of a plane extending from the second axis towards the wheel axis, means rotating the surface about its axis in a direction providing movement of the surface from a position adjacent the second axis towards the position in which the surface and wheel engage through the shortest angular distance, a brake element and means supporting the brake for pivotal movement about an axis into engagement with the wheel periphery in a position on the other side of said plane to urge the brake into operating engagement with the wheel incident to its initial engagement with the wheel.

References Cited in the file of this patent

UNITED STATES PATENTS

| | | |
|---|---|---|
| 902,965 | Howe et al. | Nov. 3, 1908 |
| 1,889,947 | Carlson | Dec. 6, 1932 |
| 2,565,233 | Hunter | Aug. 21, 1951 |
| 2,654,416 | Maniscalo | Oct. 6, 1953 |
| 2,728,236 | Hemmeter | Dec. 27, 1955 |

FOREIGN PATENTS

| | | |
|---|---|---|
| 346,958 | Italy | Dec. 14, 1936 |